(12) United States Patent
Amanuma et al.

(10) Patent No.: US 6,540,636 B2
(45) Date of Patent: Apr. 1, 2003

(54) POWER TRANSMISSION MECHANISM FOR A FRONT AND REAR-WHEEL DRIVE VEHICLE

(75) Inventors: Hirokatsu Amanuma, Saitama (JP); Naoki Uchiyama, Saitama (JP); Kenji Honda, Saitama (JP); Taiji Maruyama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/988,191

(22) Filed: Nov. 19, 2001

(65) Prior Publication Data
US 2002/0061801 A1 May 23, 2002

(30) Foreign Application Priority Data
Nov. 20, 2000 (JP) .......................... 2000-353027

(51) Int. Cl.$^7$ .......................... F16H 48/06; F16H 3/72; F16H 37/06
(52) U.S. Cl. .............. 475/149; 475/2; 475/5; 475/150; 180/65.2; 180/65.7
(58) Field of Search ................. 475/149, 150, 475/2, 5, 6, 9, 10; 180/65.2, 65.6, 65.7

(56) References Cited
U.S. PATENT DOCUMENTS
5,806,617 A * 9/1998 Yamaguchi ............ 180/65.2
6,383,114 B1 * 5/2002 Hoshiya et al. .......... 477/2
6,468,175 B1 * 10/2002 Lehongre ................. 475/5

FOREIGN PATENT DOCUMENTS
JP  9-315164  12/1997

OTHER PUBLICATIONS
U.S. publication 2002/0019284 filed Apr. 2001 Aikawa et al.*

* cited by examiner

Primary Examiner—Sherry Estremsky
Assistant Examiner—Tisha D. Lewis
(74) Attorney, Agent, or Firm—Armstrong, Westerman & Hattori, LLP (57) ABSTRACT

A power transmission mechanism for a front and rear-wheel drive vehicle in which the power of an electric motor is transmitted to rear wheels includes an output shaft adapted to rotate together with the electric motor, a middle shaft which is parallel with the output shaft, a drive shaft which is parallel with the output shaft and is adapted to rotate together with the rear wheels, a first pair of reduction gears for reducing the speed of rotation of the middle shaft relative to the output shaft, a second pair of reduction gears for reducing the speed of rotation of the drive shaft relative to the middle shaft and a rear differential disposed closer to an electric motor side than the second pair of reduction gears and coupled to the reduction gear and the drive shaft.

8 Claims, 5 Drawing Sheets

POWER TRANSMISSION MECHANISM FOR A FRONT AND REAR-WHEEL DRIVE VEHICLE

BACKGROUND OF THE INVENTION

1. Field of the Invention

The present invention relates to a power transmission mechanism for a front and rear-wheel drive vehicle in which one of pairs of front and rear drive. Wheels is driven by an engine whereas the other pair is driven by an electric motor.

2. Description of the Related Art

Known as a conventional power transmission mechanism of this type is a power transmission mechanism which is disclosed in, for example, JP-A-9-315164. This power transmission mechanism is applied to a hybrid vehicle in which front wheels are driven by an engine whereas rear wheels are driven by an electric motor. The power transmission mechanism comprises a viscous coupling provided between the electric motor for driving the rear wheels and the rear wheels, and two clutches for providing engagement and disengagement between the viscous coupling and the left and right rear wheels, respectively. In this power transmission mechanism, when driving the rear wheels, the power of the electric motor is transmitted to the left and right rear wheels via the viscous coupling and the left and right clutches. On the contrary, at other times than of driving the rear wheels, the two clutches disengage the viscous coupling from the left and right rear wheels, whereby the electric motor is prevented from constituting a rotational resistance while running, to improve the fuel economy. In addition, the viscous coupling and the electric motor are coupled together via a speed reduction mechanism which is constituted by two bevel gears which mesh with each other.

In a hybrid vehicle as described above, an electric motor is installed in addition to an engine, and therefore it is desirable to have a power transmission mechanism made as small as possible. In the above conventional power transmission mechanism, however, the speed reduction is implemented only in one stage by the two bevel gears except for the speed reduction implemented by the viscous coupling. Therefore, when trying to ensure a desired running performance, the motor cannot be made smaller but a larger motor has to be used. Thus, it becomes difficult to have a miniaturized power transmission mechanism. In other words, a miniaturized electric motor reduces the power that is to be transmitted to the rear wheels in accordance with the degree of miniaturization thereof, leading to the deterioration of the running performance. In order to compensate for the decrease in running performance, there is considered the increasing of the reduction ratio of the speed reduction mechanism. In such a case, however, the bevel gear on the downstream side or on the viscous coupling side becomes larger, and this causes an enlargement of the speed reduction mechanism in contradiction to the desire, making it difficult to miniaturize the power transmission mechanism.

SUMMARY OF THE INVENTION

The invention was made in view of the above situation, and an object thereof is to provide a power transmission mechanism for a front and rear-wheel drive vehicle which can realize the miniaturization of the power transmission mechanism while maintaining a desired running performance, whereby the fuel economy is improved.

With a view to attaining the object, according to a first aspect of the invention, there is provided a power transmission mechanism 1 for a front and rear-wheel drive vehicle 2 in which one of pairs of front and rear drive wheels (for example, front wheels 4, 4 in an embodiment (hereinafter, the same in this first aspect) ) is driven by an engine 3 whereas the other pair (rear wheels 6, 6) is driven by an electric motor 5 for transmitting the power from the electric motor 5 to the other pair of drive wheels (rear wheels 6, 6), the power transmission mechanism comprising an output shaft 11 adapted to rotate together with the electric motor 5, a rotatable middle shaft 12 which is parallel with the output shaft 11, a drive shaft 13 which is parallel with the output shaft 11 and is adapted to rotate together with the other pair of drive wheels (rear wheels 6, 6), a middle shaft speed reduction mechanism (a first pair of reduction gears 14b) having an output shaft speed reduction member (a reduction gear 14a) provided on the output shaft 11 and a first middle shaft speed reduction member (a reduction gear 14b) provided on the middle shaft 12 and adapted to reduce the speed of the middle shaft 12 relative to the output shaft 11 through coupling of the output shaft speed reduction member (the reduction gear 14a) and the first middle shaft speed reduction member (the reduction gear 14b), a drive shaft speed reduction mechanism (a second pair of reduction gears 15) having a second middle shaft speed reduction member (a reduction gear 15a) provided on the middle shaft 12 and a drive shaft speed reduction member (a reduction gear 15b) provided on the drive shaft 13 and adapted to reduce the speed of the drive shaft 13 relative to the middle shaft 12 through coupling of the second middle shaft speed reduction member (the reduction gear 15a) and the drive shaft speed reduction member (the reduction gear 15b), and a differential (a rear differential 20) disposed closer to the electric motor 5 in an axial direction of the drive shaft 13 than the drive shaft speed reduction mechanism (the second pairs of reduction gears 15) for coupling the drive shaft speed reduction member (the reduction gear 15b) and the drive shaft 13, 13.

According to the power transmission mechanism for a front and rear-wheel drive vehicle, the power of the electric motor is reduced in speed in one stage by the middle shaft speed reduction mechanism between the output shaft and the middle shaft and is then reduced in another stage by the drive shaft speed reduction mechanism between the middle shaft and the drive shaft, whereby the power is transmitted to the drive shaft and the other pair of drive wheels which are made integral with the drive shaft via the differential 20 after it has been reduced in speed in two stages. Thus, since the power of the electric motor is transmitted to the other pair of drive wheels in a state in which the power is reduced in speed in two stages by the two speed reduction mechanisms, a larger reduction ratio can be obtained without enlarging the speed reduction mechanism when compared to the conventional power transmission mechanism in which a set of gears is used to reduce in speed the power of the electric motor. As a result, the electric motor can be made smaller while maintaining the running performance. In addition, since the two speed reduction mechanisms are constituted by the three rotating shafts (the output shaft, the middle shaft and the drive shaft) which are parallel with one another and the four speed reduction members in total which are provided on these rotating shafts, the axial dimensions of the respective rotating shafts can be. Controlled.

Consequently, being different from the conventional power transmission mechanism, with the power transmission mechanism according to the first aspect of the invention, the power transmission can be miniaturized, and as a result the fuel economy can be improved. Furthermore, since the differential is disposed closer to the electric motor than the drive shaft speed reduction mechanism in the axial direction of the drive shaft, the electric motor and the differential which are heavier in weight of the constituent components of the power transmission mechanism can be disposed centrally between the left and right drive wheels with a dynamically good balance, and the lengths of the two drive shafts for connecting the differential with the left and right drive wheels can be made substantially equal to each other, whereby the left and right drive wheels can be driven with an ideally good balance.

According to a second aspect of the invention, there is provided a power transmission mechanism 1 for a front and rear-wheel drive vehicle 2 as set forth in the first aspect of the invention, further comprising a clutch 17 provided on the middle shaft 12 for providing engagement and disengagement between the first middle shaft speed reduction member (the reduction gear 14b) and the second. Middle shaft speed reduction member (the reduction bear 15a).

According to the power transmission mechanism for a front and rear-wheel drive vehicle, since the clutch is provided on the middle shaft, the engagement of the clutch can be implemented in a state in which the differential rotation between clutch members is small when compared to a case where the clutch is provided on the output shaft, and therefore the wear of the clutch members and the generation of heat therein can be suppressed, whereby the durability of the clutch can be improved. On the other hand, when compared with a case where the clutch is provided on the drive shaft, since the engagement of the clutch can be implemented in a state in which torque to be transmitted by the clutch is small due to the fact that speed reduction until then is implemented in one stage, the capacity of the clutch can be made small. Consequently, both the improvement in the durability of the clutch and reduction in the capacity thereof can be attained with good balance.

According to a third aspect of the invention, there is provided a power transmission mechanism 1 for a front and rear-wheel drive vehicle 2 as set forth in the second aspect of the invention, wherein the clutch 17 is provided on the middle shaft 12 and is disposed on an opposite side to the electric motor 5 relative to the first middle shaft speed reduction member (the reduction gear 14b) and the second middle shaft speed reduction member (the reduction gear 15a) in an axial direction of the middle shaft 12.

According to the power transmission mechanism for a front and rear-wheel drive vehicle, since the clutch is disposed on the opposite side to the electric motor relative to the first and second middle shaft speed reduction members in the axial direction of the middle shaft, not only can a space for installing a drive mechanism for driving the clutch be easily secured, but also work can easily be carried out for engaging this drive mechanism with a power source.

According to a fourth aspect of the invention, there is provided a power transmission mechanism 1 for a front and rear- wheel drive vehicle 1 as set forth in any of the first to third aspects of the invention, further comprising first and second casing members 31, 32 for accommodating the output shaft 11, the middle shaft 12 and the drive shaft 13 which are disposed to confront each other and are coupled together, two output shaft bearing portions (radial ball bearings 41, 42) provided on the first and second casing members 31, 32, respectively, for rotatably supporting the output shaft 11, two middle, shaft bearing portions (radial ball bearings 43, 44) provided on the first and second casing members 31, 32, respectively, for rotatably supporting the middle shaft 12, and two drive shaft bearing portions (radial ball bearings 45, 46) provided on the first and second casing members 31, 32, respectively, for rotatably supporting the drive shaft 13.

According to the power transmission mechanism for a front and rear-wheel drive vehicle, the respective output shaft, middle shaft and drive shaft are rotatably supported by the respective bearing portions on the two coupled casing members and are accommodated in the two casing members. Consequently, in assembling the power transmission mechanism, not only can the respective rotating shafts are supported on the bearing portions on the respective casing members by providing the respective bearing portions at the predetermined positions on the casing members but also the three rotating shafts can be positioned relative to one another with ease and accuracy only by coupling the two casing members.

DETAILED DESCRIPTION OF THE PREFERRED EMBODIMENTS

Figure 1:
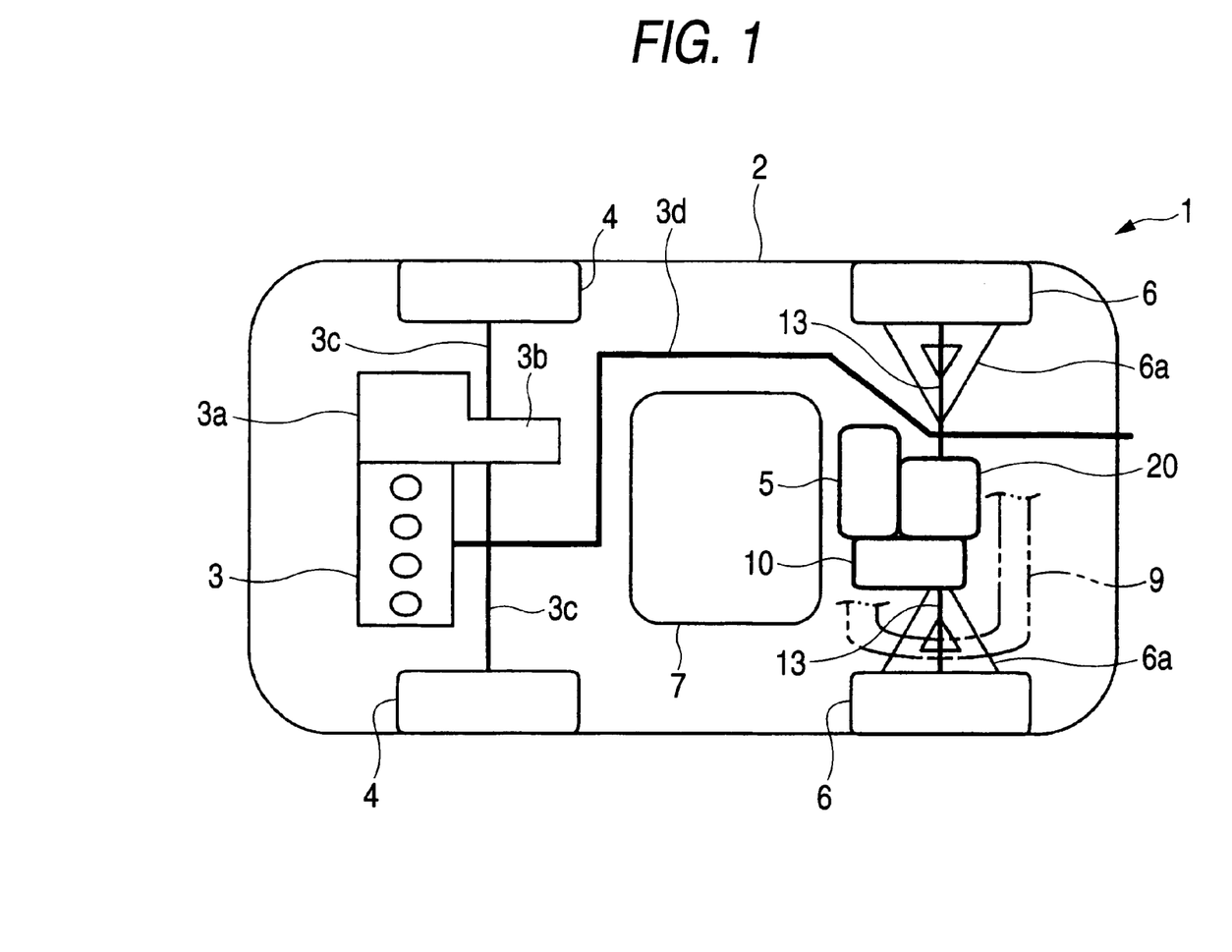
FIG. 1 is a schematic construction of a front and rear-wheel drive vehicle to which a power transmission mechanism according to an embodiment of the invention is applied.

Referring to the appended drawings, a power transmission mechanism according to an embodiment of the invention will be described as below. FIG. 1 shows the schematic construction of a front and rear-wheel drive vehicle (hereinafter, referred to as a "vehicle") 2 to which the power transmission mechanism 1 according to the embodiment is applied. As shown in the same figure, this vehicle is a four-wheel drive vehicle in which left and right front wheels 4, 4 (one of pairs of drive wheels) are driven by an engine 3 whereas right and left rear wheels 6, 6 (the other pair of drive wheels) are driven by an electric motor (hereinafter, referred to as a "motor") 5. The engine 3 is mounted transversely at a front portion of the vehicle 2 and is connected to the front wheels 4, 4 via an automatic transmission 3a, a front differential gear device 3b and front axles 3c, 3c.

Figure 2:
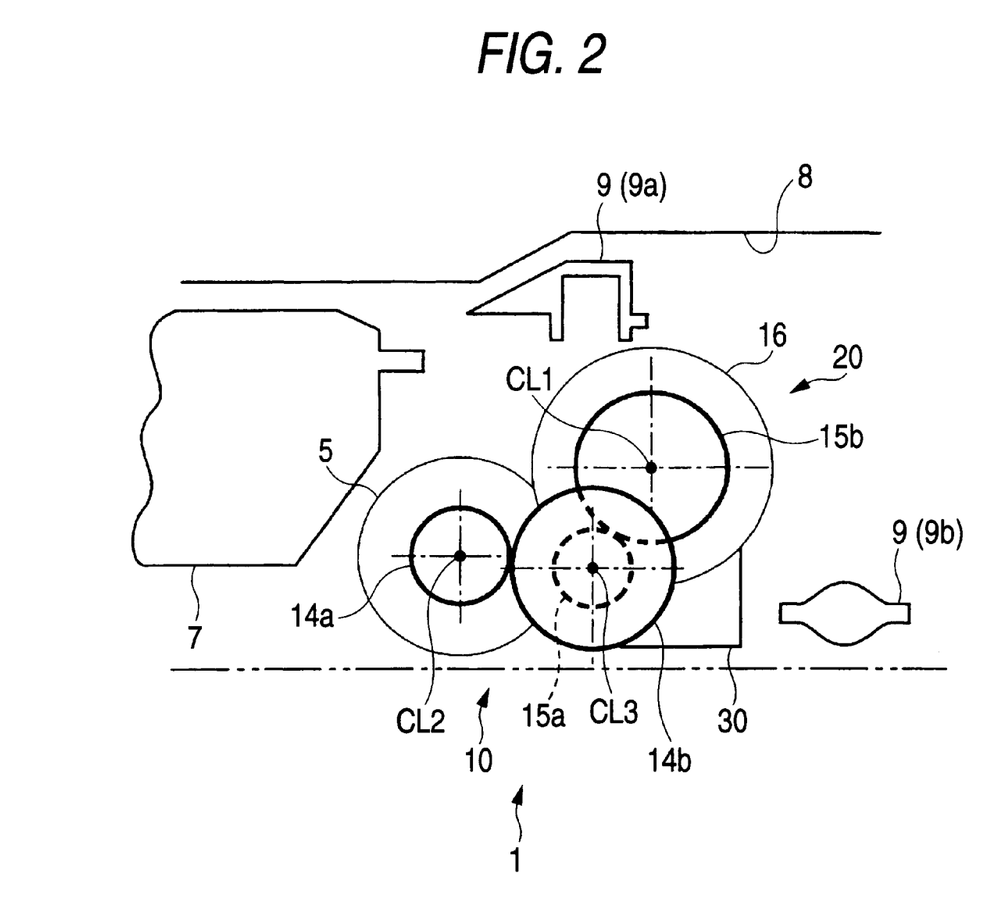
FIG. 2 is an explanatory view showing the arrangement of an output shaft, a middle shaft and a drive shaft of the power transmission mechanism.

The motor 5 is connected to a battery (not shown) and rotates when electric power is supplied thereto from the battery. In addition, this power transmission mechanism 1 is adapted to transmit torque of the motor 5 to the rear wheels 6, 6 as power, and is constituted by a speed reduction device 10, a rear differential 20 and the like, as will be described later. As shown in FIG. 2, the power transmission mechanism 1 is disposed under a rear floor panel 8 and to the rear of a fuel tank 7. Note that two-dot chain lines in FIG. 2 show the contour of a portion of the vehicle which constitutes a minimum ground clearance. The motor 5, the speed reduction device 10 and the rear differential 20 are accommodated within a casing 30 (refer to FIG. 3) together, and a lower side portion of this casing 30 constitutes an oil pan for reserving lubricating oil.

In addition, a rear cross beam 9 is mounted on the rear floor panel 8. This rear cross beam 9 is fixed to a frame (not shown), has a high rigidity, increases the, rigidity of a body of the vehicle 2 in cooperation with the frame and supports rear suspensions 6a. The respective rear wheels 6 are connected to the frame and the rear cross beam 9 via the respective rear suspensions 6a, whereby vibrations generated while the vehicle is running are attenuated. Furthermore, the rear cross beam 9 is formed into a substantially square frame by assembling together an upper support portion 9a which extends transversely along a lower surface of the rear floor panel 8 and a lower support portion 9b which extends transversely at a position diagonally downwardly rearward of the upper support portion 9a (refer to FIG. 1).

The casing 30 is mounted on the support portions 9a, 9b via bolts and rubber bushes (both not shown) with the rotational center CL1 of a drive shaft 13, which will be described later, aligning linearly with the upper and lower support portions 9a, 9b in a diagonal direction between them. With this alignment, the casing 30 is rigidly mounted on the rear cross beam 9, and the drive shaft 13 is supported both longitudinally and transversely with good balance. Furthermore, an exhaust pipe 3d extends from the engine 3 to a rear end portion of the vehicle body while bypassing the fuel tank 7.

Figure 3:
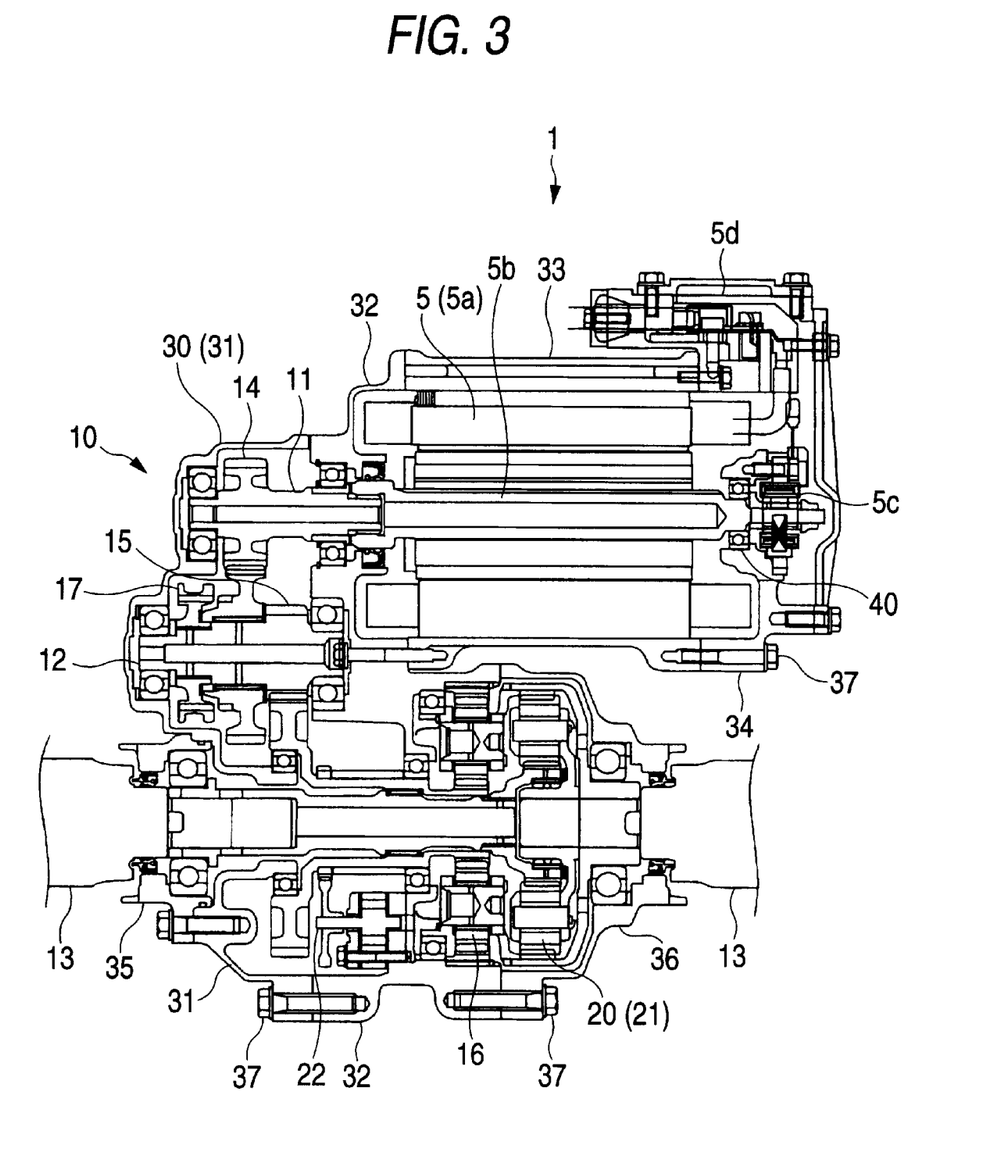
FIG. 3 is a cross-sectional plan view showing the schematic construction of the power transmission mechanism.
Figure 4:
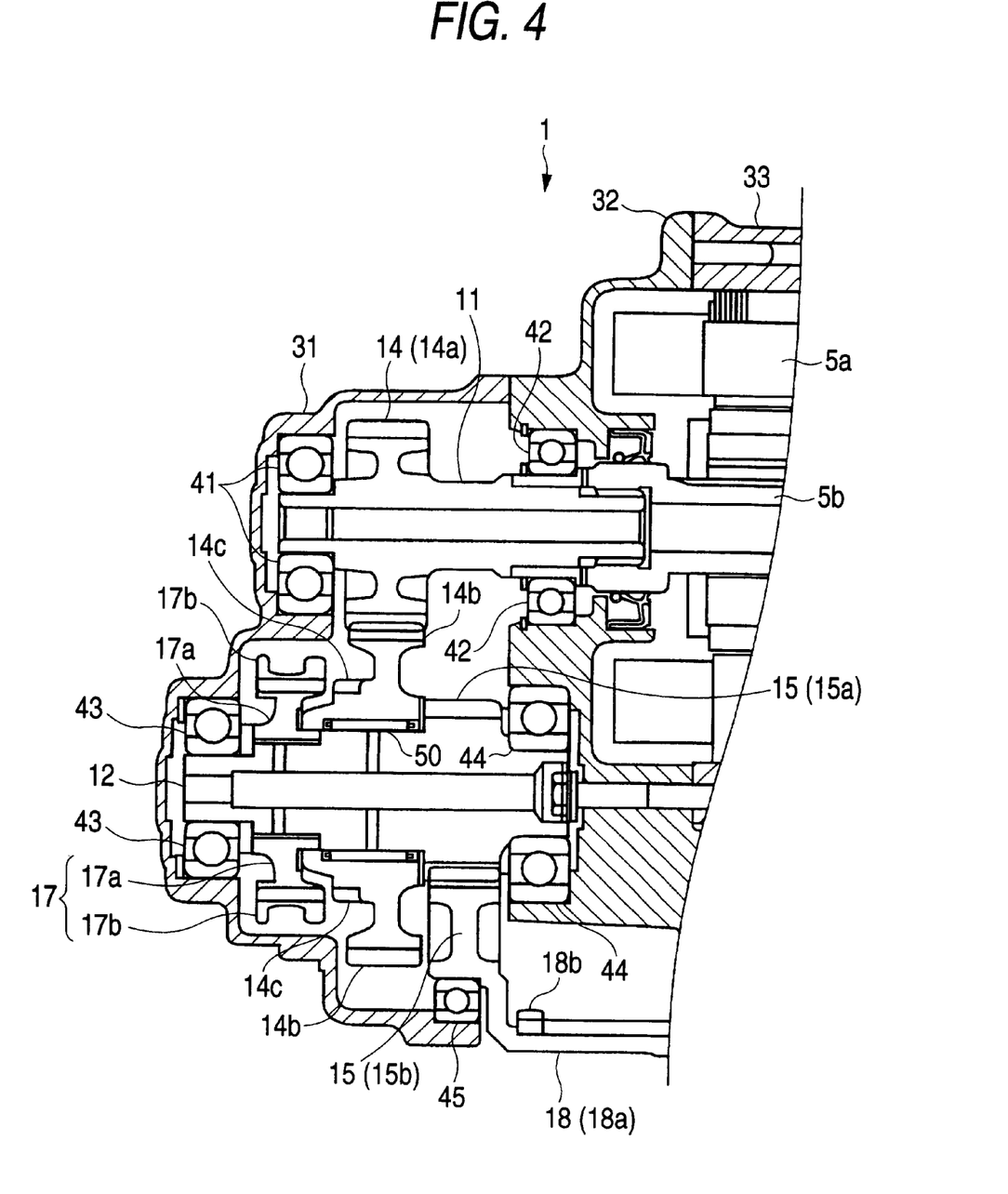
FIG. 4 is an enlarged view of a portion of FIG. 3 where a first pair of reduction gears and a second pair of reduction gears are provided.
Figure 5:
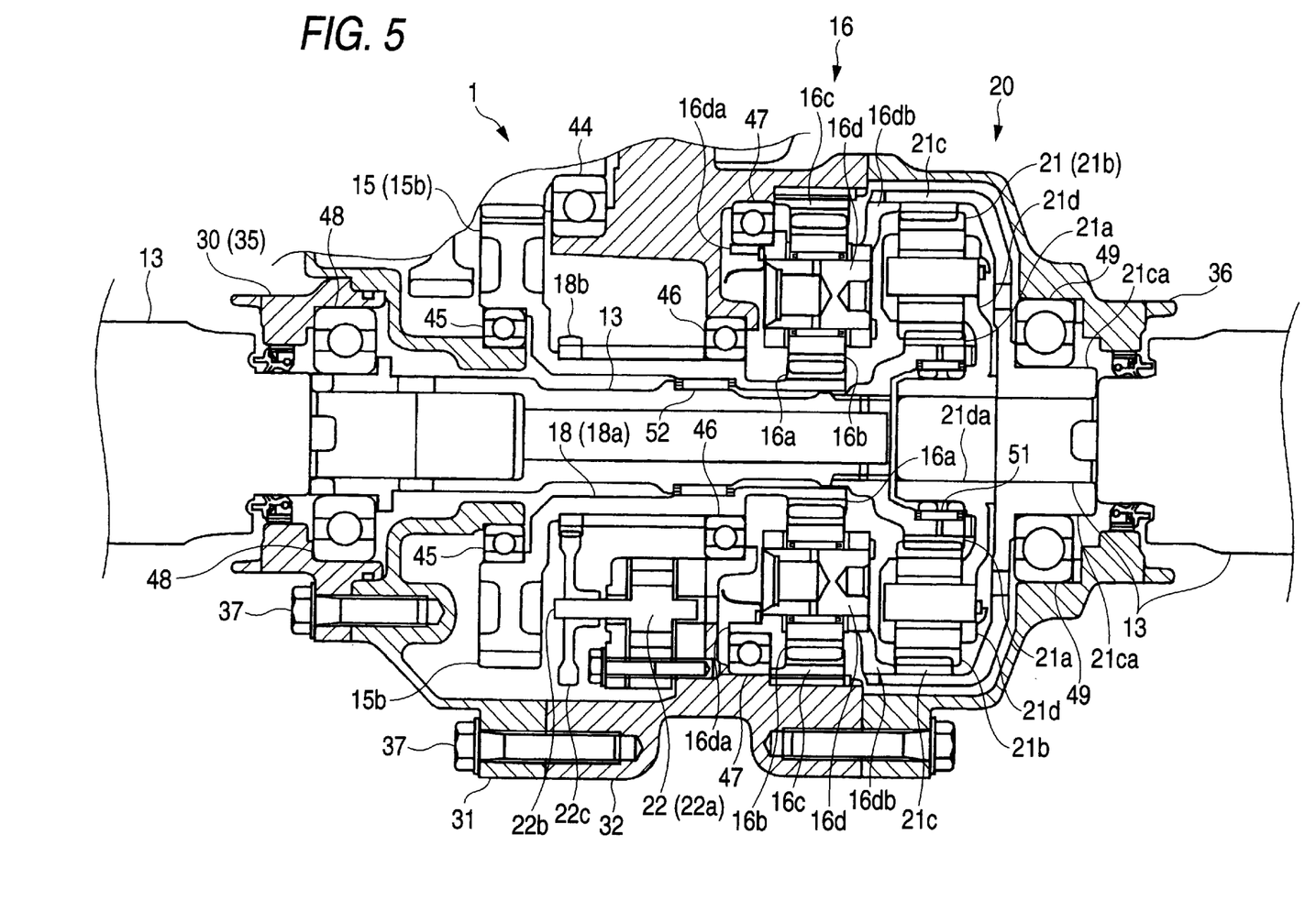
FIG. 5 is an enlarged view of a portion of FIG. 3 where a rear differential is provided.

FIGS. 3 to 5 show the schematic construction of the power transmission mechanism 1. Upper and lower sides of these figures correspond to front and rear sides of the vehicle 2. In addition, hatching is omitted to facilitate understanding in all the components in FIG. 3 and in all the components except the casing 30 in FIGS. 4 and 5. As shown in those figures, the casing 30 is constituted by first and second casing members 31, 32, first and second motor casing members 33, 34 and first and second caps 35, 36 which are assembled together with a number of bolts 37. These casing members 31 to 34 and the caps 35, 36 are all made through casting.

The first motor casing member 33 is substantially cylindrical and is made to open in a transverse direction. Additionally, the first casing member 33 is fixed to the second casing member 32 at a left end portion and to the second motor casing member 34 at a right end portion thereof. The motor 5 is accommodated within these casing members 32 to 34, and the motor 5 is constituted by a stator 5a and a rotor 5b.

The rotor 5b extends transversely, and a left end portion of the rotor 5b is fitted in a radial ball bearing 42 provided in the first casing member 32 whereas a right end portion thereof is fitted in a radial ball bearing 40 provided in the second motor casing member 34, whereby the rotor 5b is rotatably supported on the radial ball bearings 40, 42. Additionally, the rotor 5b is hollow and has a hole which opens to the left end thereof. Furthermore, a resolver 5c for detecting the rotation of the motor 5 and the like are accommodated within the second motor casing member 34, and a power source terminal box 5d for supplying electric power to the motor 5 and the like are provided at a front end portion thereof.

In addition, as will be described later, the speed reduction device 10 is adapted to reduce the rotating speed of the motor 5 in three stages for transmission to the rear differential 20. The speed reduction device 10 includes an output shaft 11 and a middle shaft 12 which are parallel with each other, a first pair of reduction gears 14 provided on these shafts 11, 12, a second pair of reduction gears 15 provided on the middle shaft 12 and a left drive shaft 13, which will be described later, and a planetary gear unit 16 provided on the left drive shaft 13.

The output shaft 11 is disposed coaxially with the rotor 5b and extends transversely. Additionally, the output shaft 11 is fitted in a radial ball bearing 41 provided in the first casing member 31 at a left end portion and is fitted in the aforesaid hole of the rotor 5b at a right end portion thereof, whereby the output shaft 11 is rotatably supported on the two radial ball bearings 41, 42 (output bearing portions) and is then allowed to rotate together with the motor 5. In addition, a reduction gear 14a consisting of a spur wheel is formed integrally on the output shaft 11. This reduction gear 14a (an output shaft speed reduction member) normally meshes with a reduction gear 14b (a first middle shaft speed reduction member) 14b, which will be described later, whereby the aforesaid first pair of reduction gears 14 (a middle shaft speed reduction mechanism) is constituted by the speed reduction gears 14a, 14b.

On the other hand, the middle shaft 12 is fitted in a radial ball bearing 43 provided in the first casing member 31 at a left end portion and is fitted in a radial ball bearing 44 provided in the second casing member 32 at a right end portion thereof, whereby the middle shaft 12 is rotatably supported on the two radial ball bearings 43, 44 (the middle bearing portions). Provided sequentially on this middle shaft 12 from the motor 5 side are a reduction gear 15a, the reduction gear 14b, and a clutch 17. The reduction gear 15a (a second middle shaft speed reduction member) is constructed by a spur wheel formed integrally with the middle shaft 12 and normally meshes with a reduction gear 15b (a drive shaft speed reduction member), whereby the aforesaid second pairs of reduction gears (a drive shaft speed reduction mechanism) is constituted by the reduction gears 15a, 15b.

Additionally, the reduction gear 14b is fitted in the middle shaft 12 via a needle roller bearing 50. Namely, the reduction gear 14b is of an idle gear type which is rotatable relative to the middle shaft 12. Splines 14c are formed on a clutch 17 side end portion of the reduction gear 14b, and the diameter of the spline 14c is made smaller than the diameter of gear teeth that mesh with the reduction gear 14a. Furthermore, the reduction gear 14b has a larger diameter and a greater number of gear teeth than the reduction gear 14a, whereby the rotation of the output shaft 11 is transmitted to the middle shaft 12 in a state in which the speed of rotation of the output shaft 11 is reduced by the first pair of reduction gears 14.

Furthermore, the clutch 17 is a hydraulic multi-plate synchromesh clutch and is constituted by a hub 17a adapted to rotate together with the middle shaft 12, a sleeve 17b adapted to freely slide over the hub 17a in axial directions of the middle shaft 12 and a number of clutch plates (not shown) adapted to connect to each other by the sleeve 17b. This sleeve 17b is press driven by a clutch driving actuator (not shown), and moves to a reduction gear 14b side so as to mesh with the splines 14c while bringing the number of clutch plates into contact with each other, whereby the reduction gear 14b is coupled to the middle shaft 12. Thus, the reduction gear 14b is allowed to rotate together with the middle shaft 12.

The clutch driving actuator connects to an oil pump, which will be described later, via an oil path (not shown) and operates on hydraulic pressure supplied from the oil pump to thereby press drive the sleeve 17b. An electromagnetic valve (not shown) is provided along the oil path, and the opening of the electromagnetic valve is controlled by a controlling device (not shown) The oil pressure supplied to the clutch driving actuator, in other words, the pressing force of the sleeve 17b by the clutch driving actuator is controlled by controlling the opening of the electromagnetic valve, whereby torque inputted from the output shaft 11 is transmitted to the reduction gear 15a via the clutch plates of the clutch 17 at a ratio (0 to 100%) corresponding to the pressing force of the clutch driving actuator. Note that an electromagnetic clutch that can vary a transmission torque may be used as the clutch 17 instead of the hydraulic multi-plate synchromesh clutch.

In addition, an idle gear 18 is provided on the left drive shaft 13. This idle gear 18 has a base portion 18a extending in an axial direction of the left drive shaft 13, the reduction gear 15b and a sun gear 16 which are formed integrally with left and right end portions of the base portion 18a, respectively, and a pump drive gear 18b provided on a downstream side of the reduction gear 15b in such a manner as to be adjacent thereto. The pump drive gear 18b is fixed to the base portion 18a.

The base portion 18a is formed into a cylindrical shape and has an internal hole which opens outwardly at ends thereof, whereby the base portion 18a fits on the left drive shaft 13 via the internal hole. The diameter of the left end portion of the internal hole is made larger than those of any other portions. The base portion 18a fits on a radial ball bearing 45 provided in the first casing member 31 from the outside at the large diameter portion of the internal hole. On the other hand, a central portion of the base portion 18a is fitted in a radial ball bearing 46 provided in the second casing member 32, whereby the idle gear 18 is rotatably supported on the radial ball bearings 45, 46.

Furthermore, the reduction gear 15b has a larger diameter and a larger number of gear teeth than the reduction gear 15a, whereby the rotation of the middle shaft 12 is transmitted to the idle gear 18 in a state in which the speed of rotation of the middle shaft 12 is reduced by the second pair of reduction gears 15.

The sun gear 16a constitutes the planetary gear unit 16 together with a plurality of (for example, four). Planetary pinion gears 16a, a ring gear 16c and a planetary carrier 16d. The ring gear 16c is fixed to the second casing member 32. The plurality of pinion gears 16b are mounted rotatable relative to the planetary carrier 16d and is disposed between the sun gear 16a and the ring gear 16c in such a manner as to normally mesh with the sun gear 16a and the ring gear 16c.

Furthermore, the planetary carrier 16d has a ring-like projection 16da which projects leftward from the planetary pinion gears 16b, and this ring-like projection 16da is fitted in a radial ball bearing 47 provided in the second casing member 32, whereby the planetary carrier 16d is rotatably supported on the radial ball bearing 47. In addition, the planetary carrier 16d has a connecting portion 16db which projects rightward from the planetary pinion gears 16b, and the connecting portion 16db is connected to a ring gear 21c, which will be described later, of the rear differential 20.

In the planetary gear unit 16 that has been described heretofore, the respective planetary pinion gears 16b rotate as the sun gear 16a rotates, and the planetary carrier 16d rotates at a slower rotating speed than that of the sun gear 16a. Namely, when the idle gear 18 rotates, the speed of rotation thereof is reduced for transmission to the rear differential 20 of the ring gear 21c.

On the other hand, the rear differential 20 (a differential) is constituted by a differential gear mechanism 21 and two left and right drive shafts 13, 13 connected to the differential gear mechanism 21. This differential gear mechanism 21 is a planetary gear unit which is similar to the aforesaid planetary gear unit and comprises a sun gear 21a, a plurality of (for example, four) planetary pinion gears 21b, a ring gear 21c and a planetary carrier 21d.

Any of the plurality of planetary pinion gears 21b is rotatably mounted on the planetary carrier 21d and normally meshes with the sun gear 21a and the ring gear 21c. In addition, the planetary carrier 21d has a cylindrical stationary portion 21da, which is fixed to a left end portion of a right drive shaft 13. On the other hand, the sun gear 21a is fixed to a right end portion of the left drive shaft 13 at a left end portion thereof and has an internal hole whose diameter increases rightward, whereby the sun gear 21a is fitted in the stationary portion 21da at a right end portion of the internal hole via a needle roller bearing 51.

Additionally, the ring gear 21c is connected to the planetary carrier 16d of the planetary gear unit 16 at a left end portion thereof, and a cylindrical portion 21ca having an internal hole is formed integrally at a right end of the ring gear 21c which cylindrical portion 21ca has a smaller diameter than those of any other portions of the ring gear 21c. This cylindrical portion 21ca is fitted in a radial ball bearing 49 provided in the second cap 36 and rotatably fits on the left end portion of the right drive shaft 13. An oil groove (not shown) is formed on the wall of the internal hole, and a portion between the ring gear 21c and the right drive shaft 13 is lubricated with lubricating oil flowing in the oil groove. Thus, the right drive shaft 13 is rotatably supported in the radial ball bearing 49 via the cylindrical portion 21ca of the ring gear 21c.

In the differential gear mechanism 21 constructed as described above, as the ring gear 21c rotates, the planetary pinion gears 21b (namely, the planetary carrier 21d) and the sun gear 21a rotate, this rotating the left and right drive shafts 13, 13. As this occurs, in case there is produced a differential rotation between the left and right rear wheels 6, 6 due to the difference in turning radius between the rear wheels, the differential rotation is absorbed by the differential gear mechanism 21.

On the other hand, the left and right drive shafts 13, 13 are disposed coaxially with each other and are provided in parallel with the output shaft 11 and the Middle shaft 12. Additionally, the middle shaft 12 is disposed such that the center of rotation CL3 of the middle shaft 12 is positioned below a line connecting the center of rotation CL1 of the drive shaft 13 and the center of rotation CL2 of the output shaft 11 (refer to FIG. 2).

In addition, the left drive shaft 13 is supported on the idle gear 18 via a needle roller bearing 52 in the vicinity of a location where the idle gear 18 fits in the radial ball bearing 46 and fits in a radial ball bearing 48 provided in the first cap 35 at a location more leftward than the needle roller bearing 52. Accordingly, the left drive shaft 13 is rotatably supported directly on the needle roller bearing 52 and the radial ball bearing 48 and is rotatably supported indirectly on the radial ball bearings 45, 46 (drive shaft bearing portions) via the idle gear 18.

Additionally, an oil pump 22 is accommodated within the second casing member 32. A suction port (not shown) of the oil pump 22 is positioned in lubricating oil in the oil pan and a discharge port (not shown) of the oil pump 22 is connected to the clutch driving actuator via the oil path. In addition, the oil pump 22 is a gear pump which incorporates two gears 22a, 22a (only one of the two being shown) which mesh with each other, and one of the gears 22a is formed coaxially and integrally with a pump shaft 22b. A driven gear 22c, which normally meshes with the pump drive gear 18b, is formed integrally with the pump shaft 22b, whereby the pump drive gear 18b is driven to rotate at all times while the wheels 6 are rotating to thereby supply lubricating oil within the oil pan to the clutch drive actuator via the oil path as hydraulic pressure. In addition, oil paths are formed in the respective shafts, whereby the oil pump 22 supplies lubricating oil to the needle roller bearings 50 required for lubricating via the oil paths.

Furthermore, all the respective gears of the pairs of gears 14, 15, the planetary gear unit 16 and the differential gear mechanism 21 are in a state in which they are partially submerged in lubricating oil in the oil pan (not shown), and as they rotate in conjunction with rotation of the motor 5, the lubricating oil is splashed up (or scooped up) toward the respective gears, whereby the drive train is lubricated.

In the power transmission mechanism 1 constructed as described above, when the motor 5 rotates upon supply of electric power, the torque thereof is transmitted to the rear wheels 6, 6 via the output shaft 11, the first pair of reduction gears 14, the clutch 17, the second pair of reduction gears 15, the planetary gear unit 16 and the differential gear mechanism 21. As this occurs, the speed of rotation of the motor 5 is reduced in three stages by virtue of reduction ratios of the first and second pairs of reduction gears 14, 15 and the planetary gear unit 16 for transmission to the left and right rear wheels 6, 6, whereby a larger reduction ratio can be obtained without enlarging the reduction mechanism when compared with the conventional example in which the speed of rotation of the motor is reduced with a set of bevel gears. As a result, the motor 5 can be miniaturized while maintaining the running performance of the vehicle. In addition, since the speed reduction device 10 for reducing the speed of rotation in three stages is constituted by the shafts 11 to 13 which are parallel with one another and the gears provided on those shafts 11 to 13, the axial dimensions of the respective shafts can be prevented from being increased. Furthermore, since the middle shaft 12 is disposed such that the center of rotation CL3 thereof is positioned below the line connecting the center of rotation CL1 of the drive shaft 13 and the center of rotation CL2 of the output shaft 11, the longitudinal and vertical dimensions of the power transmission mechanism 1 can be prevented from being increased. Consequently, being different from the conventional power transmission mechanism, the power transmission 1 of the invention can be miniaturized while maintaining the running performance of the vehicle, and as a result, the fuel economy can be increased.

In addition, since the rear differential 20 is disposed closer to the motor 5 side than the second pair of reduction gears 15 in the axial direction of the drive shaft 13, the motor 5 and the rear differential 20, which are heavier among the constituent components of the power transmission mechanism 1, can be disposed centrally between the left and right rear wheels 6, 6 with good dynamic balance. Further, the two left and right drive shafts 13, 13 which connect the rear differential 20 with the left and right rear wheels 6, 6, respectively, can be made equal in length to each other, whereby the left and right rear wheels 6, 6 can be driven with ideally good balance. Furthermore, since the motor 5, which is heavier in weight, is disposed ahead of the drive shaft 13, the center of gravity of the vehicle 2 is allowed to be situated more centrally of the vehicle when compared with a case where the motor is disposed to the rear of the drive shaft 13, whereby an ideal longitudinal weight distribution of the vehicle can be attained.

Additionally, since the middle shaft 12 is provided on the clutch 17, the clutch 17 can be engaged in a state in which the differential rotation between the clutch plates is smaller when compared with a case in which the clutch 17 is provided on the output shaft 11, the wear of the clutch plates and generation of heat therein can be suppressed, thereby increasing the durability of the clutch. On the other hand, when compared with a case in which the clutch 17 is provided on the drive shaft 13, since there exists a reduction in a single stage until then, the clutch 17 can be engaged in a state in which torque to be transmitted by the clutch 17 is smaller, whereby the capacity of the clutch can be made smaller. Consequently, the increase in durability and reduction incapacity of the clutch can be at tained with good balance.

In addition, since the clutch 17 is disposed on the opposite side to the motor 5 relative to the second pair of reduction gears 15 in the axial direction of the middle shaft 12, the space can easily be secured for installing the clutch drive actuator for driving the clutch 17 and the like, and the work for connecting the clutch drive actuator with the oil path can also be implemented easily.

Furthermore, the output shaft 11, the middle shaft 12 and the drive shaft 13 are rotatably supported on the radial ball bearings 41, 43, 45 in the first casing member 31 and the radial ball bearings 42, 44, 46 in the second casing member 32 and are accommodated in the two casing members 31, 32 in that condition. Consequently, in assembling the power transmission mechanism 1, the shafts can be supported on the two bearings, respectively by mounting the casing members 31, 32 on the bearings 41 to 46 at the predetermined positions and the three shafts can be positioned with ease and accuracy only by coupling the two casing members 31, 32. In addition, these casing members 31, 32 can easily be made through casting.

Note that the construction for reducing the speed of rotation of the middle shaft 12 relative to the output shaft 11 and the construction for reducing the speed of rotation of the drive shaft 13 relative to the middle shaft 12 are not limited to the first and second pairs of reduction gears 14, 15 according to the embodiment of the invention in which the two reduction gears are combined but a construction may be used in which the speed of rotation of one of the two shafts can be reduced to the other. For example, a construction may be adopted in which two sprockets provided on the two shafts are coupled by a chain or two pulleys provided on the two shafts may be coupled together with a belt. In addition, the construction for supporting rotatably the output shaft 11, the middle shaft 12 and the drive shaft 13 is not limited to the radial ball bearings 41 to 44, 48, 49 and the needle roller bearings 51, 52 according to the invention, but a construction maybe used which is provided on the first and second casing members 31, 32 and can support rotatably the three shafts 11 to 13 in a state in which those three shafts are positioned relative to each other. Furthermore, the rear differential 20 is not limited to the planetary gear unit according to the embodiment of the invention, but any construction may be adopted as long as the construction can absorb the difference in rotation between the left and right wheels. For example, a differential gear mechanism which incorporates bevel gears or viscous coupling may be considered. Furthermore, the clutch 17 is not limited to the hydraulic differential multi-plate synchronized clutch but may be of any type in which the two reduction mechanisms can be engaged or disengaged.

As has been described heretofore, according to the power transmission mechanism of the invention, a larger reduction ratio can be obtained without enlarging the speed reduction mechanism. As a result, the electric motor can be miniaturized while maintaining the running performance of the vehicle. In addition, the axial dimensions of the respective shafts can be prevented from being increased. Consequently, the power transmission mechanism can be miniaturized while maintaining the running performance of the vehicle, and as a result, the fuel economy can be increased. In addition, the left and right drive wheels can be driven with ideally good balance. Furthermore, the increase in durability and reduction in capacity of the clutch can both be attained with good balance by providing the clutch on the middle shaft. Moreover, the space can easily be secured for installing the drive mechanism for driving the clutch, and the work can also carried out with ease for connecting the driving mechanism with the power supply source. In assembling the power transmission mechanism, the tree rotating shafts can be positioned relative to one another with ease and accuracy by allowing the respective rotating shafts to be supported on the bearing portions on the respective casing members and coupling the two casing members.

What is claimed is:

1. A power transmission mechanism for a front and rear-wheel drive vehicle in which one of pairs of front and rear drive wheels is driven by an engine whereas the other pair is driven by an electric motor, for transmitting the power from said electric motor to said the other pair of drive wheels, said power transmission mechanism comprising:
   an output shaft adapted to rotate together with said electric motor;
   a rotatable middle shaft which is parallel with said output shaft;
   a drive shaft which is parallel with said output shaft and is adapted to rotate together with said the other pair of drive wheels;
   a middle shaft speed reduction mechanism having an output shaft speed reduction member provided on said output shaft and a first middle shaft speed reduction member provided on said middle shaft and adapted to reduce the speed of said middle shaft relative to said output shaft through coupling of said output shaft speed reduction member and said first middle shaft speed reduction member;
   a drive shaft speed reduction mechanism having a second middle shaft speed reduction member provided on said middle shaft and a drive shaft speed reduction member provided on said drive shaft and adapted to reduce the speed of said drive shaft relative to said middle shaft through coupling of said second middle shaft speed reduction member and said drive shaft speed reduction member; and
   a differential coupling said drive shaft speed reduction member and said drive shaft.

2. The power transmission mechanism as set forth in claim 1, wherein said differential is disposed closer to said electric motor in an axial direction of said drive shaft than said drive shaft speed reduction mechanism.

3. The power transmission mechanism as set forth in claim 1, further comprising:
   a clutch provided on said middle shaft, for providing engagement and disengagement between said first middle shaft speed reduction member and said second middle shaft speed reduction member.

4. The power transmission mechanism as set forth in claim 3, wherein said clutch is disposed on an opposite side to said electric motor relative to said first middle shaft speed reduction member and said second middle shaft speed reduction member in an axial direction of said middle shaft.

5. The power transmission mechanism as set forth in claim 1, further comprising:
   first and second casing members disposed to confront with each other and are coupled together, for accommodating said output shaft, said middle shaft and said drive shaft;
   first and second output shaft bearing portions provided on said first and second casing members, respectively, for rotatably supporting said output shaft;
   first and second middle shaft bearing portions provided on said first and second casing members, respectively, for rotatably supporting said middle shaft; and
   first and second drive shaft bearing portions provided on said first and second casing members, respectively, for rotatably supporting said drive shaft.

6. The power transmission mechanism as set forth in claim 5, further comprising:
   a planetary gear unit coupled onto said drive shaft speed reduction mechanism and said differential, said planetary gear unit having:
   a sun gear connected to said drive shaft speed reduction member;
   a planetary carrier connected to said differential;
   a ring gear fixed to said second casing member; and
   planetary pinion gears disposed between said sun gear and said ring gear to mesh with said sun gear and said ring gear.

7. The power transmission mechanism as set forth in claim 5, wherein said middle shaft is disposed such that a rotation center thereof is positioned below a line connecting rotation centers of said drive shaft and said output shaft.

8. The power transmission mechanism as set forth in claim 1, further comprising:
   a planetary gear unit coupled onto said drive shaft speed reduction mechanism and said differential, and adapted to reduce the speed of said drive shaft relative to said drive shaft speed reduction member.

* * * * *